(12) United States Patent
Thomson et al.

(10) Patent No.: US 8,392,013 B2
(45) Date of Patent: Mar. 5, 2013

(54) BUSINESS PROCESS AUTOMATION

(75) Inventors: Neil Thomson, Inverness (GB);
Grzegorz R. Pusz, Wroclaw (PL)

(73) Assignee: Microgen Aptitude Limited (GB)

( * ) Notice: Subject to any disclaimer, the term of this patent is extended or adjusted under 35 U.S.C. 154(b) by 410 days.

(21) Appl. No.: 11/341,156

(22) Filed: Jan. 27, 2006

(65) Prior Publication Data
US 2006/0247805 A1   Nov. 2, 2006

(30) Foreign Application Priority Data

Jan. 27, 2005 (GB) .................................. 0501730.6

(51) Int. Cl.
*G06F 19/00* (2011.01)
*G06F 3/048* (2006.01)
*G06Q 10/00* (2012.01)
*G06G 7/48* (2006.01)

(52) U.S. Cl. ........ 700/181; 715/764; 715/769; 715/771; 717/155; 717/156; 717/157; 705/1.1; 705/7.26; 703/6

(58) Field of Classification Search .................. 700/180, 700/181; 715/764, 769, 771, 744; 717/155, 717/156, 157, 101; 705/1.1, 7.26; 703/6
See application file for complete search history.

(56) References Cited

U.S. PATENT DOCUMENTS

| | | | |
|---|---|---|---|
| 4,333,144 A | 6/1982 | Whiteside et al. | |
| 4,885,684 A | 12/1989 | Austin et al. | |
| 5,075,847 A | 12/1991 | Fromme | |
| 5,265,249 A | 11/1993 | Kumamoto | |
| 5,276,881 A | 1/1994 | Chan et al. | |
| 5,301,270 A | 4/1994 | Steinberg et al. | |
| 5,625,823 A | 4/1997 | Debenedictis et al. | |
| 5,642,511 A | 6/1997 | Chow et al. | |
| 5,651,108 A * | 7/1997 | Cain et al. ..................... | 715/763 |

(Continued)

FOREIGN PATENT DOCUMENTS

| | | |
|---|---|---|
| EP | 0640914 | 3/1995 |
| EP | 1643435 | 4/2006 |

(Continued)

OTHER PUBLICATIONS

Gurd, J.R. et al., "The Manchester Prototype Dataflow Computer," *Communications of the ACM*, vol. 28, No. 1, pp. 34-52 (Jan. 1985).

(Continued)

*Primary Examiner* — Jeffrey A Gaffin
*Assistant Examiner* — Darrin Dunn
(74) *Attorney, Agent, or Firm* — Thompson Hine, L.L.P.

(57) ABSTRACT

A method for automating a process includes the following steps: providing a user interface which graphically presents a plurality of icons to a user, wherein each icon represents an operation step having at least one input and at least one output; enabling the user to select one or more of the icons; enabling the user to form connections between the selected icons to represent data flow between the operation steps represented by the icons; and generating computer instructions for executing the operation steps corresponding to the selected icons, and in accordance with the connections, in such a way that each operation step can only be executed when data is present at all of its inputs, and cannot be executed when data is absent at any one of its inputs.

14 Claims, 4 Drawing Sheets

U.S. PATENT DOCUMENTS

| | | | | |
|---|---|---|---|---|
| 5,748,963 | A * | 5/1998 | Orr | 717/131 |
| 5,761,656 | A * | 6/1998 | Ben-Shachar | 1/1 |
| 5,815,152 | A * | 9/1998 | Collier et al. | 715/839 |
| 5,987,246 | A | 11/1999 | Thomsen et al. | |
| 6,002,867 | A * | 12/1999 | Jazdzewski | 717/105 |
| 6,012,035 | A * | 1/2000 | Freeman et al. | 705/2 |
| 6,144,984 | A * | 11/2000 | DeBenedictis et al. | 718/106 |
| 6,185,728 | B1 * | 2/2001 | Hejlsberg | 717/109 |
| 6,460,147 | B1 | 10/2002 | Cox | |
| 6,823,495 | B1 | 11/2004 | Vedula et al. | |
| 6,922,814 | B2 * | 7/2005 | Sirhall | 715/769 |
| 6,985,900 | B2 * | 1/2006 | Codd et al. | 707/6 |
| 7,134,090 | B2 | 11/2006 | Kodosky et al. | |
| 7,225,411 | B1 | 5/2007 | Stoner et al. | |
| 7,376,550 | B1 | 5/2008 | Bokaemper et al. | |
| 7,774,172 | B1 | 8/2010 | Yunt et al. | |
| 7,809,545 | B2 * | 10/2010 | Ciolfi et al. | 703/22 |
| 8,196,056 | B2 * | 6/2012 | Ciolfi | 715/771 |
| 2001/0034562 | A1 | 10/2001 | Aumer et al. | |
| 2002/0080157 | A1 * | 6/2002 | Chickles et al. | 345/700 |
| 2003/0167445 | A1 | 9/2003 | Su et al. | |
| 2004/0049773 | A1 | 3/2004 | Yotsukura | |
| 2004/0254945 | A1 | 12/2004 | Schmidt et al. | |
| 2005/0257193 | A1 | 11/2005 | Falk et al. | |
| 2005/0257194 | A1 * | 11/2005 | Morrow et al. | 717/109 |
| 2006/0031715 | A1 * | 2/2006 | Klein et al. | 714/23 |
| 2006/0150148 | A1 * | 7/2006 | Beckett et al. | 717/109 |
| 2007/0055964 | A1 * | 3/2007 | Mirkazemi et al. | 717/140 |
| 2007/0239498 | A1 | 10/2007 | Shukla et al. | |
| 2008/0034303 | A1 * | 2/2008 | Evans | 715/763 |
| 2008/0082961 | A1 | 4/2008 | Adams et al. | |
| 2009/0204914 | A1 | 8/2009 | King et al. | |
| 2010/0031084 | A1 | 2/2010 | Tremblay et al. | |
| 2010/0131289 | A1 * | 5/2010 | Brandt et al. | 705/2 |
| 2010/0306000 | A1 * | 12/2010 | Green et al. | 705/7 |

FOREIGN PATENT DOCUMENTS

| | | |
|---|---|---|
| WO | WO 03/050677 | 6/2003 |

OTHER PUBLICATIONS

Strom, R. et al., "Poster Submission—A Visual Environment for Distributed Object-Oriented Multi-Applications," OOPSLA '92, Addendum to the Proceedings, pp. 205-206, Vancouver, British Columbia (Oct. 1992).

Linthicum, D.S., "Get the Picture with Visual Programming," *Application Development Trends*, pp. 52-58 (Feb. 1994).

Dyer, D. S., "Visualization. A Dataflow Toolkit for Visualization," *IEEE Computer Graphics and Applications*, vol. 10, No. 4, pp. 60-69 (Jul. 1990).

"Breaking the Software Development Bottleneck, " AVS/Express, Advanced Visual Systems Inc. (Mar. 1994).

Veen, Arthur H., "Dataflow Machine Architecture," *ACM Computing Surveys*, vol. 18, No. 4, pp. 365-396 (Dec. 1986).

Gordon, R. et al., "Oracle Fusion Middleware—Fusion Developer's Guide for Oracle Application Development Framework 11g Release 1 (11.1.1)" (May 2009), pp. i-xliv, and Chapters 1, 14, 18, and 37; retrieved from the internet: http://download.oracle.com/docs/cd/E12839_01/web.1111/b31974.pdf.

Beecher, V. et al., "Oracle Fusion Middleware—Developer's Guide for Oracle SOA Suite, 11 g Release 1 (11.1.1)" (May 2009), pp. i-xl, and Chapters 1, 2, and 5; retrieved from the Internet: http://download.oracle.com/docs/cd/E12839_01/integration.1111.e10224.pdf.

Armstrong, E. et al., The J2EE™ 1.4 Tutorial for Sun Java System Application Server Platform Edition 8.2 (Dec. 7, 2005).

Braga, D. et al., "XQBE: A Graphical Environment to Query XML Data," World Wide Web: Internet and Web Information Systems, Kluwer Academic Publishers, vol. 8, No. 3, p. 287-316 (2005).

Weisstein, E., "Normal Distribution," MathWorld—A Wolfram Web Resource, http://mathworld.wolfram.com/NormalDistribution.htm (May 18, 2011).

Beecher, V. et al., "Oracle® Fusion Middleware, Developer's Guide for Oracle SOA Suite 11g Release (11.1.1) E10224-01," Chapters 1, 14 and 18 (May 2009).

* cited by examiner

Data Flow

BUSINESS PROCESS AUTOMATION

This application claims priority to Great Britain application 0501730.6, filed Jan. 27, 2005.

The present invention relates to business process automation, and may handle large numbers of complex messages very quickly.

BACKGROUND

The invention can be used in a large range of fields where process automation is required. The invention may be used for example to control machinery, such as a precision lathe or conveyor belts. It may also be used to automate processes in the fields of telecommunications, and to automate financial and business processes.

Traditionally experts in the field of a relevant technology or business formulate a set of requirements which for example may define a method of implementing a method or analyzing results. These requirements must then be translated into a formal set of processes and rules and converted into computer software processes which then implement the requirements.

For example a new pricing structure for gas and electricity may be devised by an energy supply company. The company managers and accountants will write a set of criteria by which the pricing structure is to be generated. In a simple example these criteria may include the cost to the company, the quantity used, the overheads and outgoings connected with supply and the profit to be achieved. These criteria, and their relationship to each other, might first be embodied in a written report. They must then be converted into a clear sequence of steps, for example by illustrating them in a flow chart diagram, and eventually a computer programmer translates the sequence of steps into computer code embodying the required process and rules to implement the new pricing structure.

This is an expensive and time consuming exercise and is vulnerable to the introduction of errors in the interpretation of the requirements and their translation into a finished software product because of the number of layers of personnel involved and the different "languages" or models of the world that they use.

Software packages are available to assist in the formulation of processes and rules but they are difficult for a non-computer expert to use directly and it is still necessary to employ an information technology expert. It is also known to use a data driven software model; see for example Dataflow Machine Architecture, Arthur H Veen, ACM Computing Surveys, Vol 18, No 4, December 1986.

SUMMARY

The invention provides a method of automating a business process and a computer system as set out in the accompanying claims.

BRIEF DESCRIPTION OF THE DRAWINGS

Embodiments of the invention will now be described, by way of example only, with reference to the accompanying drawings, in which.

DETAILED DESCRIPTION

Figure 1:
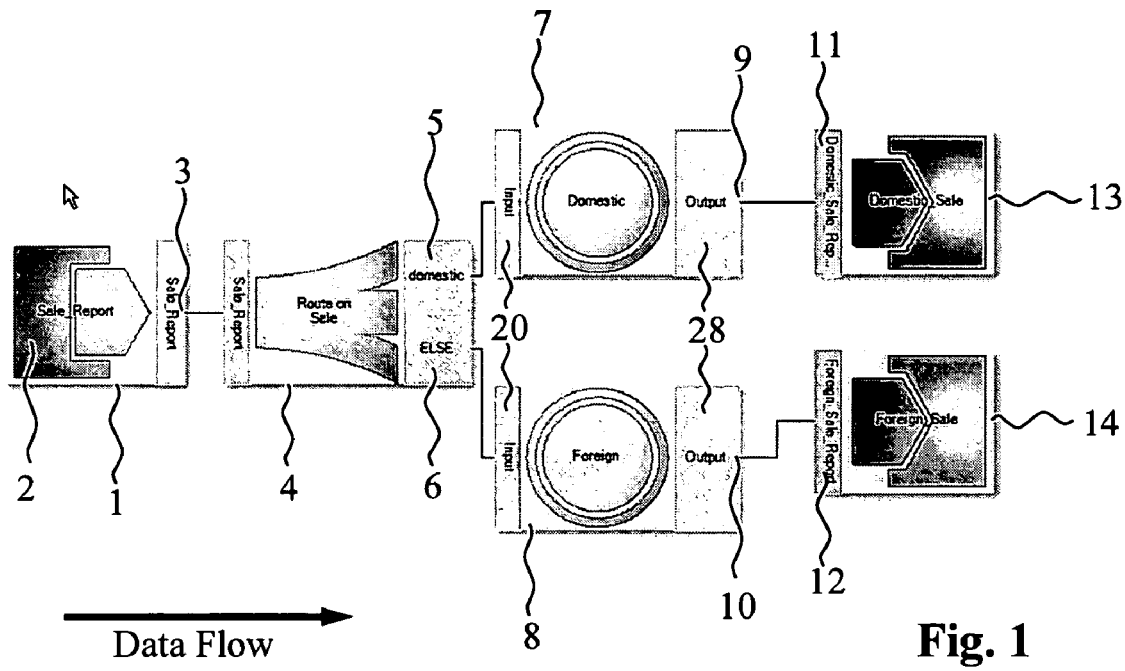
FIG. 1 illustrates, in graphical form, the automation of a process using the invention.

FIG. 1 shows the automation of an accounting process, but it is to be understood that the invention may of course be used in many different fields.

In FIG. 1 a set of icons are shown connected together to illustrate one example of a business process. Each icon effectively represents a logic block or routine in the process and the icons fall into four general logic categories: source, routing, rules and target, each having their own distinctive appearance to make identification easier for the user. The icons can simply be selected from an on-screen menu and dragged and dropped in the appropriate place on the screen for example using a mouse to control a cursor shown as an arrow 40 in FIG. 4.

Figure 4:
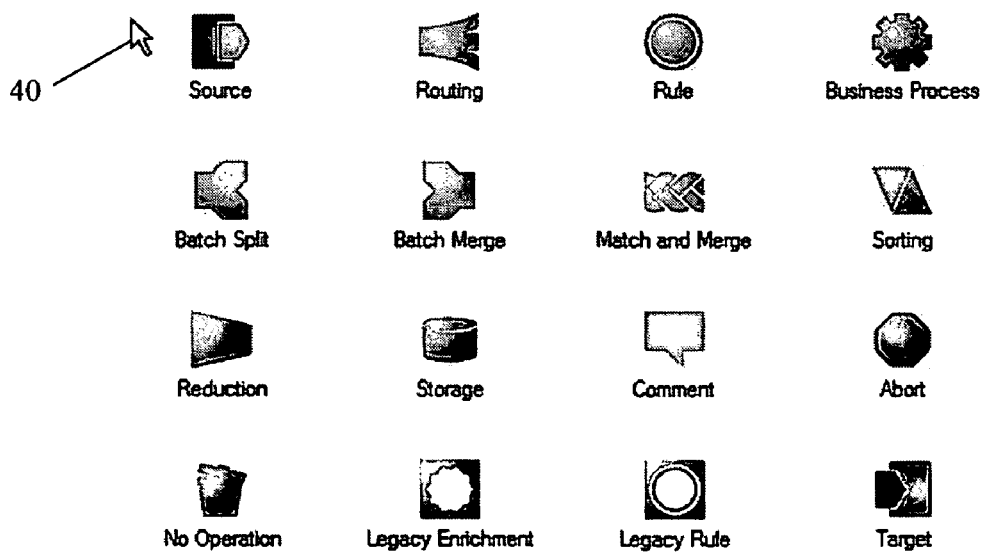
FIG. 4 illustrates a set of icons for use in formulating the process of FIG. 1.

A suitable set of process icons is shown in FIG. 4 and the icons represent: source, routing, rule, business process, batch split, batch merge, match and merge, sorting, reduction, storage, comment, abort, no operation, legacy, enrichment, legacy rule and target. Of course these are given as examples only. Thus, the user selects and positions, on the screen, each of a source icon, a routing icon, one or more rule icons and a corresponding number of target (output) icons. The user then generates lines on the display between icons to show functional connections between the logic blocks represented by the icons.

The icons are then labelled by the user who also adds further functional criteria defining operations to be carried out by the logic. For example, data attributes are chosen and operations for the rule blocks, are defined. These steps are typically taken using pop-up menus with predefined choices but the choices may be customised for particular business applications or particular users and may include options to define new definitions and operations as required.

The example of a process illustrated in FIG. 1 is a relatively simple example and relates to the analysis of sales of a product. The process uses an external source comprising a sales report and produces output data for each of the total domestic and total foreign sales. The results can be supplied to an external data target such as a general ledger.

Thus a user selects a source block 1 and defines it as comprising a sales report 2 including a sales report database table 3. The user then selects a routing block 4, connects it to source block 1, and defines the operation to be carried out by the routing block: ie to segregate the data from the database table 3 into two categories: "domestic" 5 and "ELSE" 6. The user labels the output ports 5 and 6 accordingly. Two rule blocks 7 and 8 are then selected, positioned and connected so that domestic data 5 is supplied to "Domestic" rule block 7 and the rest of the data "ELSE" 6 is supplied to "Foreign" rule block 8. Operations are carried out on the data according to the rules defined by the rule blocks 7 and 8 as will be explained in more detail with regard to FIG. 2. The results appear at the respective output ports 9 and 10. The user selects two target blocks 13, 14 and connects one to each of the output ports 9 and 10. The target blocks are then labelled appropriately "Domestic Sales" 13 and "Foreign Sales" 14. These results at the output ports 9 and 10 are supplied to the respective database tables 11 and 12 of the target blocks 13 and 14 depending on whether the result relates to domestic sales or foreign sales. Data flow is of course from left to right in FIG. 1.

Figure 2:
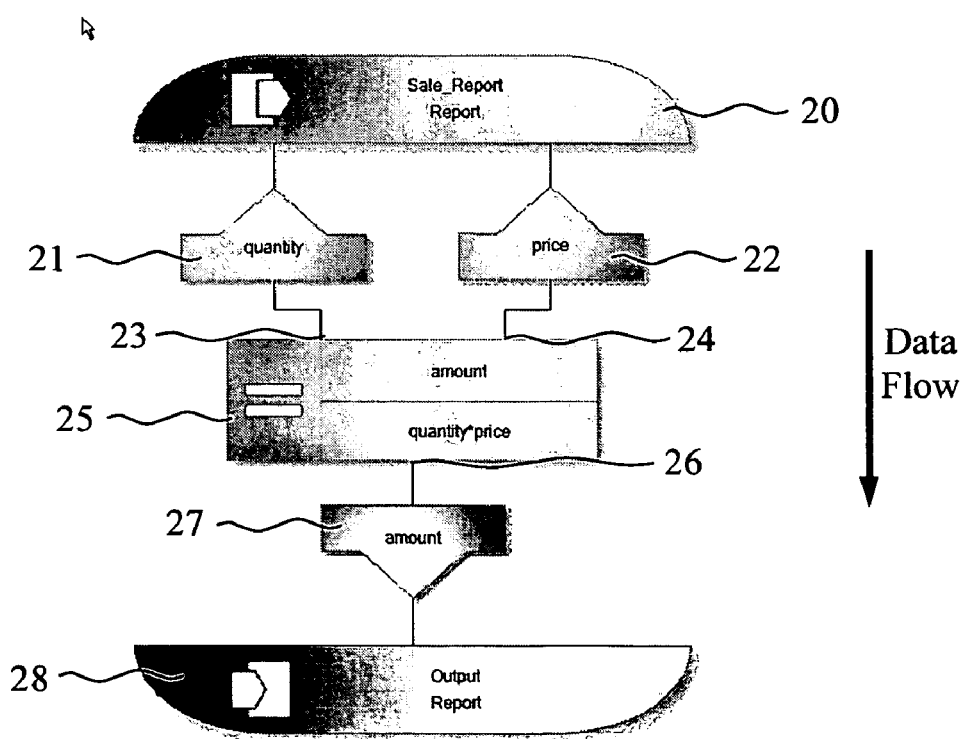
FIG. 2 illustrates a rule forming a part of the process of FIG. 1.
Figure 5:
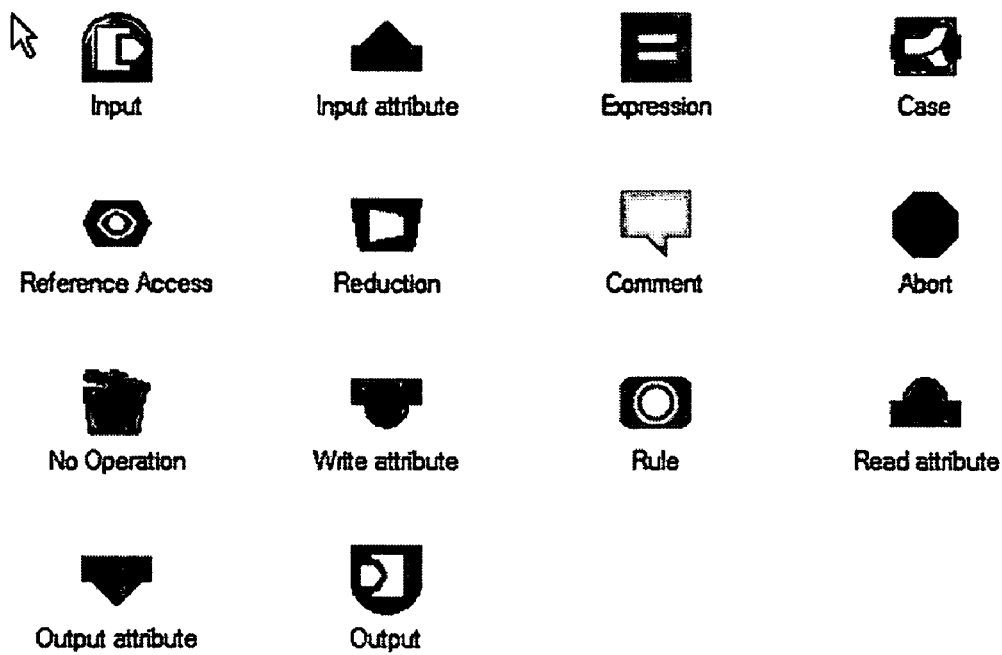
FIG. 5 illustrates a set of icons for use in formulating the rule of FIG. 2.

The rule blocks 7 and 8 are each defined by a similar method to that of FIG. 1 and this is shown in FIG. 2 where data flow is from top to bottom. The set of blocks for rule definition is shown in FIG. 5. These include Input, Input attribute, Expression, Case Reference Access, Reduction, Connect, Abort No Operation, Write Attribute, Route, Read Attribute, Output Attribute and Output. An input block 20 is selected and defined to comprise the sales report data segregated by the routing block 4, either domestic 5 for domestic rule block 7 or foreign 6 for foreign rule block 8. Attribute blocks are selected and defined as comprising "quantity" 21 and "price" 22 and these represent logic which extracts the relevant data attributes from the data. An expression block 25 is next chosen and defined to perform an operation to be conducted on the attribute values. In this case the attributes "quantity" appearing at input port 23 of the expression block 25 and "price" appearing at input port 24 are to be multiplied together and supplied at output port 26 to produce the resulting output attribute 27 comprising the "amount". This result is written to the output report 28 appearing at output port 9, 10 respectively connected to a respective target block 13, 14.

Thus it can be seen that a user of this system would select and connect appropriate process icons to define a process such as that illustrated in FIG. 1 and would define the rules for rule blocks 7, 8 by selecting and connecting appropriate rule icons as shown in FIG. 2. Details would then be entered for each of the blocks to define, for example, the report to be used as a source, the attributes to be extracted, the operation to be carried out by the expression block 25 and what to call the data appearing at the output blocks 13,14. This procedure is largely graphical and intuitive and it is not necessary to be a software engineer to use it.

Figure 3:
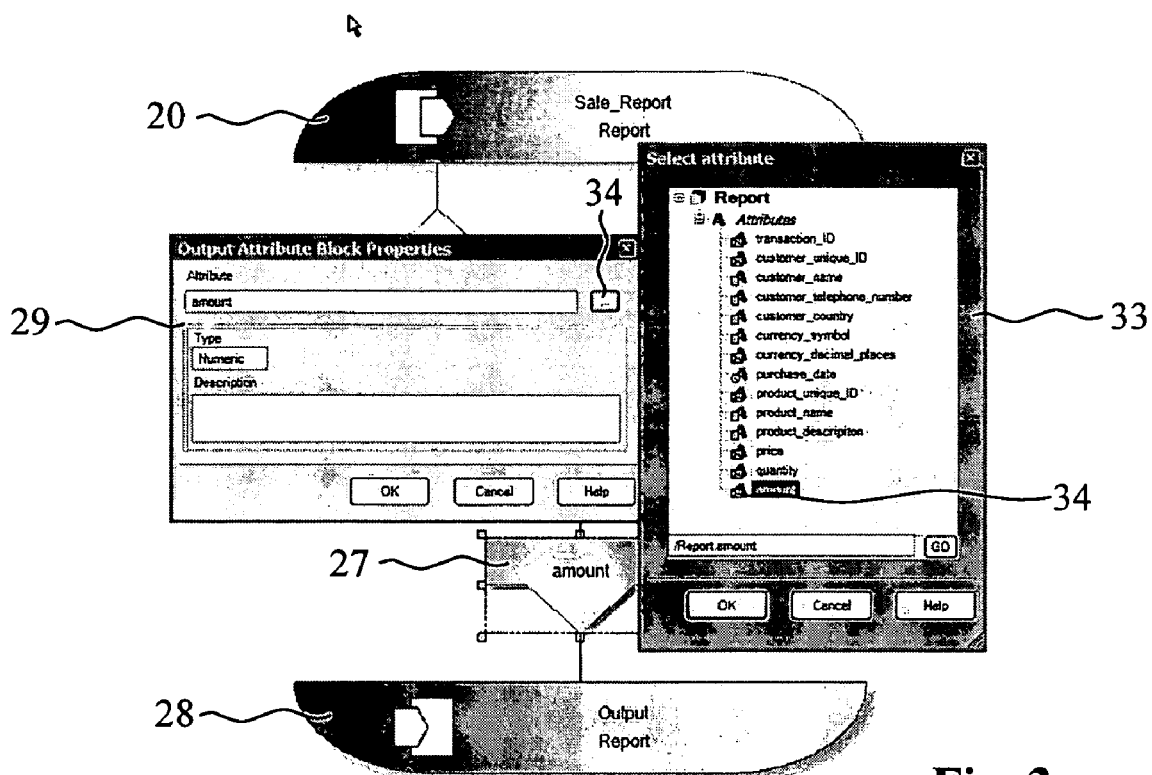
FIG. 3 illustrates an example of a screen display during formulation of the rule of FIG. 2.

FIG. 3 illustrates the process of defining the "amount" attribute block 27 in FIG. 2. The user clicks on the "amount" attribute block 27 and its properties are displayed in a pop-up property dialog box 29. In this example three fields: attribute, type and description are included in the property box 29. The user can enter alphanumeric data directly into the fields or can select the appropriate attribute from a pre-loaded list, for example as shown in the nested pop-up dialog box 33 which is displayed when the user clicks on the browse button 34. In this example, the last item on the list "amount" is selected, as shown by the highlighting of this word. Also, in this example, the type of attribute is set as "numeric". This may be automatically generated by the attribute selected, for example when "price", "quantity" or "amount" is chosen and is indicated by the type of icon 34 adjacent the attribute description. This field controls the logic of the business rule and can be used to generate help or error messages to the user to guide them through the process.

Other blocks may also be defined by rules. For example routing block 4 must be defined by specifying the appropriate criteria by which data is selected for processing by the "domestic" route or the "foreign" route. This would typically be derived from the attribute "customer_country" in the list of attributes in box 33 in the illustration of FIG. 3.

The rule defined in FIGS. 2 and 3 is an example of a flat data structure. Hierarchical data structures may also be used, in which multiple segments each containing attributes. For example, an invoice may contain "header information" giving details of each product on the invoice. There may be one or more "lines" for each header and such data is represented as a hierarchical structure. Of course very much more complex structured rules, and processes, can be formulated, as will be evident.

Figure 7:
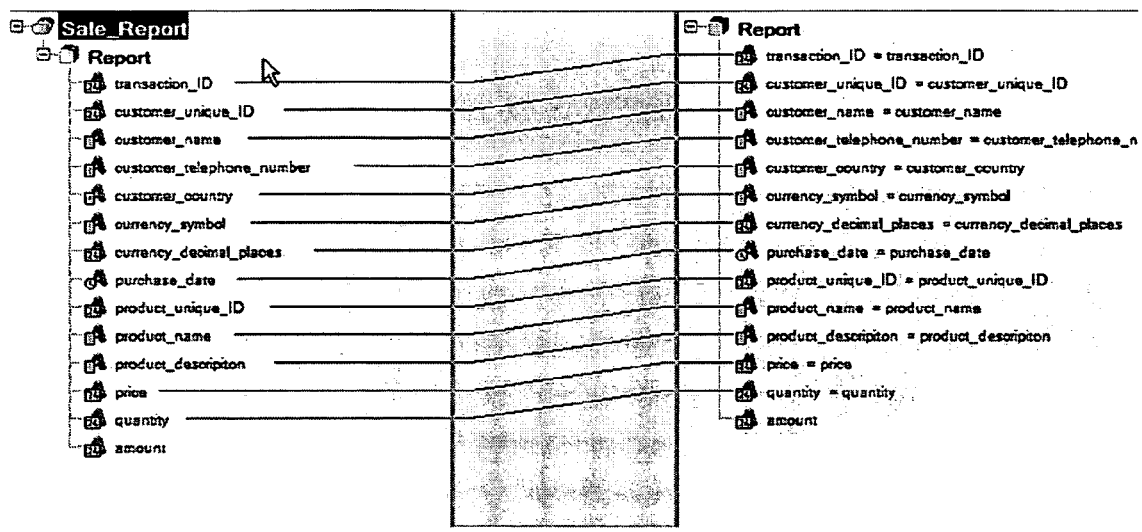
FIG. 7 is a screen display illustrating one example of the process of the invention.

In addition to computations defined by the rules the system makes it possible to map many source attributes directly onto the target attributes and this is shown in FIG. 7 where the user simply creates lines on the screen to join relevant source attributes in the sales report on the left to target attributes in the output report on the right, for example, transaction references and dates and customer identifiers (reference, name, telephone number) are all identical in both the input sales report and the output report.

The icons shown in FIGS. 4 and 5, illustrating sets of blocks for process and for rule definition respectively, are given as examples only and are not exhaustive. Alternative icons can be used and the icon set expanded to suit the particular process concerned.

Once the graphical representation of the process is completed by the user, and the rules have been defined and attributes selected, software according to the invention makes the necessary conversion into computer code to implement the process defined by the user. It does this by decomposing the logic block defined by each icon into intermediate code, representing elementary operators such as:

Read—get data from a source.
eXtract—extract an attribute value from a message.
eValuate—evaluate a logical, arithmetic or relational expression.
Gate—perform a logical switch.
Store—write a value into a target attribute.
Write—write the output message to the target.

Figure 6:
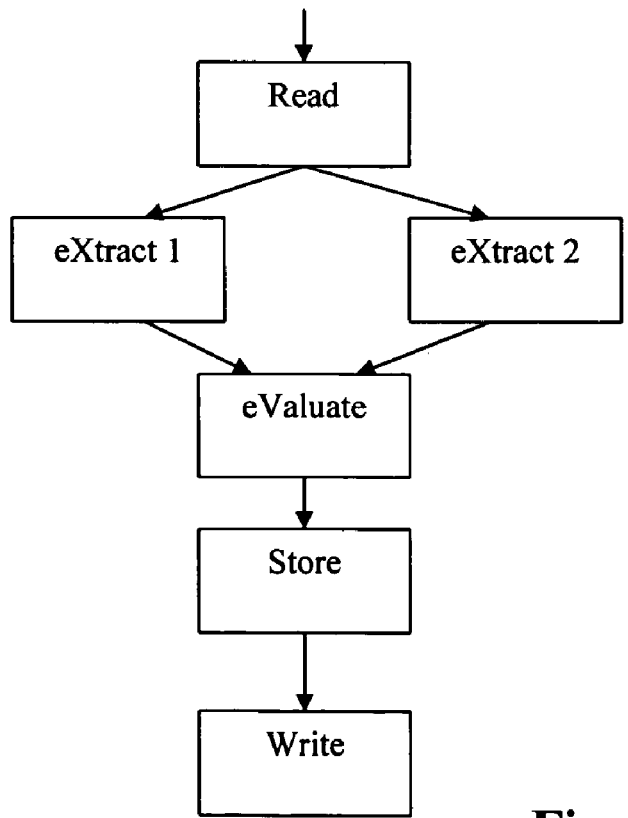
FIG. 6 is a flow diagram illustrating the compiled version of the rule of FIG. 2.

The compiled version of the rule illustrated in FIG. 2, using these elementary operators is shown in FIG. 6, and each box in FIG. 6 represents one of the elementary operators, known as a "P-code operator". Each of these P-code operators can be handled independently; the order of storage is irrelevant, because each P-code operator can only execute when there is data at all of its input ports, can only be in one of two states: not executed or executed, and can only be executed once.

The P-code operators for each rule or process are stored in a pool which is managed by an executive operator which periodically scans all of the P-code operators in the pool to search for operators which have data at all of their input ports, executes them, and changes their state from 'not executed' to 'executed'.

The executive operator module starts execution of the program and it will then respond to input data by processing it through the nodes. The executive operator module can also cope with error handling, distributing the data load across multiple instances of the program, and/or managing low level functions such as caching reference data.

Thus, in the example of the rule of FIGS. 2 and 6, the following sequence of operations occurs:

a) A first message arrives so data is presented to the source block 20 so that data is present at the input port of the Read operator (see FIG. 6) which then becomes able to execute the Read operation. No other operators can execute because there is no data on any of their input ports.

b) When the Read operator executes, data is placed at the input ports of the operators eXtract 1 and eXtract 2, so both of these could execute.

c) The executive operator will execute either one of these (the order does not matter), say eXtract 2 first, which places data at one of the input ports of the eValuate operator.

d) The eValuate operator cannot execute because it does not have data at both its input ports, therefore the only operator that can still execute is eXtract 1.

e) When eXtract 1 executes, data is present at both input ports of the eValuate operator so this can now be executed which places data at the input port of the Store operator.
f) The Store operator executes which puts data at the input of the "Write" operator which then itself executes.
g) All the operators have now executed and are now in the state "executed". They are reset and the whole cycle begins again for the next message.

This process has the significant advantage that a user does not need to specify a sequence of operations in the rules or processes, even where there is more than one possible path. Since operators only execute when data is present at all input ports the order of execution does not have to be predetermined in this model, and the user does not need to worry about the order of execution. For example in FIG. 6 it does not matter which of the eXtract operators executes first, the result is the same since the evaluate operator will not execute until both eXtract operators have executed to put data at both data input ports for the evaluate operator.

Hence a user does not need to have any knowledge of computer language or procedure.

It will be seen that the system can use an entirely graphical interface to allow a user to design the necessary processes and rules. The interface works with a unique product architecture, made possible because of the data driven nature of the process.

Production of processes and rules is much faster and more efficient using the invention and subsequent maintenance costs much reduced. Processes and rules written using this software can, for example, process 20 million messages per hour.

Although the invention is shown and described with respect to certain embodiments, it is obvious that modifications will occur to those skilled in the art upon reading and understanding the specification, and the present invention includes all such modifications.

What is claimed is:

1. A method of automating a business process, the method comprising the following steps:
    performing a first stage of a two-stage, nested process, said first stage comprising the following steps:
        providing a user interface which graphically presents a first plurality of icons to a user, said first plurality of icons being process icons wherein each process icon represents an operation step having at least one input and at least one output;
        enabling the user to select one or more of said process icons;
        enabling the user to form connections between the selected process icons to form a first graphical structure which represents data flow between the operation steps represented by the process icons;
        wherein at least some of said process icons represent rules;
    performing a second stage of a two-stage, nested process, said second stage comprising the following steps:
        defining at least one of said rules represented by a process icon by graphically presenting a second plurality of icons to a user, said second plurality of icons being rule icons wherein each rule icon represents a rule operation step having at least one input and at least one output;
        enabling the user to select one or more of said rule icons; and
        enabling the user to form connections between the selected rule icons to form a second graphical structure which represents data flow between the rule operation steps represented by the rule icons,
    the method further comprising:
    automatically generating computer instructions in the form of P-code operators directly from said process icons, rule icons and connections, without any requirement for said user to write or compile any source code;
    executing, using an executive operator, the P-code operators corresponding with said operation steps and rule operation steps corresponding to the selected process icons and rule icons, and in accordance with said connections, wherein each said operation step and rule operation step can only be executed when data is present at all of its inputs, and cannot be executed when data is absent from any one of its inputs; and
    periodically scanning said P-code operators to search for P-code operators which have data at all of their inputs, and then executing P-code operators which are found to have data at all of their inputs.

2. A method as claimed in claim 1, wherein said step of graphically presenting said plurality of icons includes displaying said plurality of icons on a computer screen.

3. A method as claimed in claim 2, wherein said step of enabling the user to select one or more of said icons includes enabling the user to select icons using a drag-and-drop operation.

4. A method as claimed in claim 1, wherein said step of generating computer instructions, in the form of P-code operators, includes:
    generating computer instructions, in the form of P-code operators, for executing the rule operation steps corresponding to the selected rule icons, and in accordance with said connections between the rule icons, wherein each rule operation step can only be executed when data is present at all of its inputs, and cannot be executed when data is absent at any one of its inputs.

5. A method as claimed in claim 1, where said step of generating computer instructions includes decomposing each operation step into one or more elementary P-code operators which can be performed on a computer using an executive operator.

6. A method as claimed in claim 5, wherein each elementary operator has one or more inputs and one or more outputs, and wherein each elementary operator can only be executed when data is present at all of its inputs.

7. A method as claimed in claim 6, where each elementary operator can only be in an executed state or a non-executed state, and can only be executed once.

8. A method as claimed in claim 1, wherein said computer instructions are computer P-code operators.

9. A method as claimed in claim 1, wherein said user interface can display dialogue boxes and/or drop-down lists which allow the user to define characteristics of said operation steps.

10. A method as claimed in claim 1, which is adapted to process source data to produce target data, and which further comprises the step of additionally allowing the user to form direct connections from at least some of said source data to at least some of said target data, and wherein data which is connected by said direct connections is unchanged when said source data is processed.

11. A method as claimed in claim 1, wherein characteristics of said operation steps and rule operation steps are definable by the user using said user interface.

12. A method as claimed in claim 1, which further comprises providing at least some of said icons with a portion of the icon which represents an input or output port, said ports performing different functions, and enabling the user to label said portion as appropriate.

13. A computer system for carrying out a method of automating a business process, the computer system comprising:
- a display for displaying, in a first stage of a two-stage nested process, a user interface which graphically presents a first plurality of icons to a user, said first plurality of icons being process icons wherein each process icon represents an operation step having at least one input and at least one output;
- input means for enabling the user to select one or more of said process icons, and for enabling the user to form connections between the selected process icons to form a first graphical structure which represents data flow between the operation steps represented by the process icons;
- wherein at least some of said process icons represent rules, and wherein:
- in a second stage of said two-stage nested process, said display graphically presents a second plurality of icons to a user, said second plurality of icons being rule icons wherein each rule icon represents a rule operation step having at least one input and at least one output;
- said input means enables the user to select one or more of said rule icons; and
- enables the user to form connections between the selected rule icons to form a second graphical structure which represents data flow between the rule operation steps represented by the rule icons, and the system further comprising:
- processing means for generating computer instructions in the form of P-code operators directly from said process icons, rule icons and connections without any requirement for said user to write or compile any source code, said computer instructions being arranged for executing the operation steps and rule operation steps corresponding to the selected process icons and rule icons, and in accordance with said connections, wherein each operation step and rule operation step can only be executed when data is present at all of its inputs, and cannot be executed when data is absent from any one of its inputs;
- and computing means for periodically scanning said P-code operators to search for P-code operators which have data at all of their inputs, and then executing P-code operators which are found to have data at all of their inputs.

14. A computer system as claimed in claim 13, wherein characteristics of said operation steps and rule operation steps are definable by the user using said user interface.

* * * * *

UNITED STATES PATENT AND TRADEMARK OFFICE
CERTIFICATE OF CORRECTION

| | | |
|---|---|---|
| PATENT NO. | : 8,392,013 B2 | Page 1 of 1 |
| APPLICATION NO. | : 11/341156 | |
| DATED | : March 5, 2013 | |
| INVENTOR(S) | : Thomson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
Thirtieth Day of December, 2014

Michelle K. Lee
*Deputy Director of the United States Patent and Trademark Office*